US008581813B2

(12) United States Patent
Park et al.

(10) Patent No.: US 8,581,813 B2
(45) Date of Patent: Nov. 12, 2013

(54) DISPLAY DEVICE, METHOD OF MANUFACTURING THE SAME AND DISPLAY PANEL FOR THE SAME

(75) Inventors: Jin-Hee Park, Seoul (KR); Young-Joo Park, Hwaseong (KR); Hoe-Woo You, Seoul (KR)

(73) Assignee: Samsung Display Co., Ltd. (KR)

( * ) Notice: Subject to any disclaimer, the term of this patent is extended or adjusted under 35 U.S.C. 154(b) by 1376 days.

(21) Appl. No.: 12/008,950

(22) Filed: Jan. 14, 2008

(65) Prior Publication Data

US 2008/0211754 A1 Sep. 4, 2008

(30) Foreign Application Priority Data

Mar. 2, 2007 (KR) .................... 10-2007-0020800

(51) Int. Cl.
*G09G 3/36* (2006.01)
(52) U.S. Cl.
USPC .............................. 345/87; 345/204; 349/149
(58) Field of Classification Search
USPC ............... 345/206, 87–104, 204, 1.1–3.4; 349/149–152; 455/566
See application file for complete search history.

(56) References Cited

U.S. PATENT DOCUMENTS

| 5,737,272 A * | 4/1998 | Uchiyama et al. ............ 345/206 |
| 2003/0227591 A1 * | 12/2003 | Liu et al. ........................ 349/143 |
| 2004/0192260 A1 * | 9/2004 | Sugimoto et al. .......... 455/412.1 |
| 2005/0052340 A1 * | 3/2005 | Goto et al. ....................... 345/1.3 |
| 2005/0146486 A1 * | 7/2005 | Lim et al. ........................ 345/1.1 |
| 2005/0270467 A1 * | 12/2005 | Lee ................................ 349/152 |
| 2006/0017873 A1 * | 1/2006 | Kim ................................ 349/129 |
| 2006/0227088 A1 * | 10/2006 | Jeon et al. ........................ 345/87 |
| 2006/0251457 A1 * | 11/2006 | Lapstun et al. ................. 400/88 |
| 2007/0035683 A1 * | 2/2007 | Yoshii ........................... 349/110 |

FOREIGN PATENT DOCUMENTS

| KR | 10-2005-0052564 | 6/2005 |
| KR | 10-2005-0057111 | 6/2005 |
| KR | 10-2006-0003053 | 1/2006 |
| KR | 10-2006-0057410 | 5/2006 |
| KR | 10-2006-0090085 A | 8/2006 |

OTHER PUBLICATIONS

Korean Patent Abstracts, Publication No. 1020050052564, Jun. 3, 2005, 1 p.
English Language Abstract, Publication No. 2005-0057111, Jun. 16, 2005, 1 p.
English Language Abstract, Publication No. 2006-0003053, Jan. 9, 2006, 1 p.
Korean Patent Abstract, Publication No. 1020060057410, May 26, 2006, 1 p.

* cited by examiner

*Primary Examiner* — Stephen Sherman
(74) *Attorney, Agent, or Firm* — Innovation Counsel LLP

(57) ABSTRACT

A display device includes a display panel, an application module, a printed circuit film and a driving unit. The display panel includes a plurality of pixel portions formed in a display area, at least one output pad formed in a first peripheral area that is formed at a first side of the display area and at least one connection line electrically connected to the output pad. At least one application module disposed adjacent the display panel. At least one printed circuit film electrically connects the output pad to the application module. The driving unit includes a pixel driving section electrically connected to the pixel portions to drive the pixel portions and an application driving section electrically connected to the connection line to drive the application module.

22 Claims, 10 Drawing Sheets

DISPLAY DEVICE, METHOD OF MANUFACTURING THE SAME AND DISPLAY PANEL FOR THE SAME

CROSS-REFERENCE TO RELATED APPLICATIONS

The present application claims priority under 35 U.S.C. §119 to Korean Patent Application No. 10-2007-20800, filed on Mar. 2, 2007 in the Korean Intellectual Property Office (KIPO), the contents of which are herein incorporated by reference in their entirety.

BACKGROUND OF THE INVENTION

1. Field of the Invention

The present invention relates to a display device, a method of manufacturing the display device and a display panel for the display device. More particularly, the present invention relates to a display device capable of reducing the number of parts and reducing the thickness of the display device, a method of manufacturing the display device and a display panel for the display device.

2. Description of the Related Art

Generally, a portable electronic apparatus, such as a cellular phone or a personal digital assistant (PDA), typically employs a liquid crystal display (LCD). Cellular phones include an LCD panel for displaying image information, a driving board for driving the LCD panel, and various application modules such as, for example, a speaker, a camera, and a vibration producing device, which are disposed around the LCD panel.

In a cellular phone of a slide type, the application modules are typically disposed adjacent the LCD panel on the viewing sides, and the driving board is disposed on the opposite side of the LCD panel. Driving elements that drive the LCD panel and the above-described application modules are typically mounted on the driving board. The LCD panel and the driving board are electrically connected to each other through a panel printed circuit film, and the driving board and the above-described application modules are electrically connected to each other through an additional printed circuit film. The additional printed circuit film is formed on a rear surface of a backlight module providing light to the LCD panel, and is electrically connected to the driving elements through an additional connector.

As a result, the additional printed circuit film and the associated connector increase manufacturing costs, and a connection process of the additional printed circuit film is required in an assembly process. Also, the additional printed circuit film formed on the rear surface of the backlight module and generates noise. In addition, the design of a portable electronic apparatus such as a cellular phone is limited in how thin the apparatus can be manufactured.

SUMMARY OF THE INVENTION

The present invention obviates the above problems and thus, the present invention provides a display device capable of reducing the number of parts and reducing the size of the display device.

The present invention also provides a method of manufacturing the above-mentioned display device.

The present invention still also provides a display panel for the display device.

In one aspect of the present invention, a display device includes a display panel, an application module, a printed circuit film and a driving unit.

The display panel includes a lower substrate, an upper substrate and a liquid crystal layer. The lower substrate has a display area, a first peripheral area, a second peripheral area, a third peripheral area and a fourth peripheral area. The third and fourth peripheral areas are respectively formed at opposite side portions of the lower substrate to connect the first and second peripheral areas to each other. The lower substrate includes a plurality of pixel portions formed in the display area, at least one output pad formed in the first peripheral area along a first side of the display area and at least one connection line electrically connected to the output pad. The upper substrate faces the lower substrate. The liquid crystal layer is interposed between the lower and upper substrates. The application module is disposed adjacent the display panel. The printed circuit film electrically connects the output pad to the application module. The driving unit is disposed on the second peripheral area of the lower substrate. The second peripheral area is formed at a second side of the display area to be opposite to the first peripheral area. The driving unit includes a pixel driving section and an application driving section. The pixel driving section is electrically connected to the pixel portions. The application driving section is electrically connected to the connection line, and is electrically connected to the output pad through the connection line to drive the application module.

The display panel may include a lower substrate having the pixel portions, the output pad and the connection line, an upper substrate facing the lower substrate and a liquid crystal layer interposed between the lower substrate and the upper substrate.

In an exemplary embodiment, the driving unit may be disposed on the lower substrate. Here, the driving unit may be disposed in a second peripheral area that is formed at a second side of the display area to be opposite to the first peripheral area, and the connection line may be formed in at least one of third and fourth peripheral areas that are respectively formed at opposite side portions of the display panel to connect the first and second peripheral areas to each other. The connection line may electrically connect the application driving section to the output pad.

Alternatively, the driving unit may be spaced apart from the display panel and disposed at an opposite location of the application module with respect to the display panel, the driving unit including a printed circuit board. Here, the lower substrate may further include at least one input pad formed in a second peripheral area that is formed at a second side of the display area to be opposite to the first peripheral area, and the connection line may be formed in at least one of third and fourth peripheral areas that are respectively formed at opposite side portions of the display panel to connect the first and second peripheral areas to each other. The connection line may electrically connect the output pad to the input pad. The display device may further include a panel printed circuit film electrically connecting the driving unit to the input pad.

For example, a liquid crystal inlet may be formed corresponding to at least one of the third and fourth peripheral areas, and not corresponding to the first and second peripheral areas, to be used in forming the liquid crystal layer by the injection of liquid crystal. The pixel driving section and the first application driving section may be integrally formed with each other. Alternatively, the pixel driving section and the first application driving section may be separately formed from each other.

The display device may further include a touch panel disposed at a surface of the display panel to generate positional information through an external touch. Alternatively, the display panel may further include a touch signal generating section configured to generate positional information through an external touch.

In another aspect of the present invention, a method of manufacturing a display device is provided as follows. A display panel including a plurality of pixel portions formed in a display area, at least one output pad formed in a first peripheral area that is formed at a first side of the display area and at least one connection line electrically connected to the output pad is formed. Then, at least one application module disposed around the display panel is electrically connected to the output pad through at least one printed circuit film.

The pixel portions may include a gate line, a data line crossing the gate line, a thin-film transistor (TFT) electrically connected to the gate line and the data line, and a pixel electrode electrically connected to the TFT. The connection line may be simultaneously formed with one of the gate line and the data line. The connection line may have a three-layered structure including a molybdenum (Mo) layer, an aluminum (Al)-neodymium (Nd) layer and a molybdenum (Mo) layer so as to reduce electrical resistance.

In still another aspect of the present invention, a display panel is electrically connected to a driving unit and at least one application module through at least one connection printed circuit film.

The display panel includes a lower substrate, an upper substrate and a liquid crystal layer. The lower substrate has a display area, a first peripheral area, a second peripheral area, a third peripheral area and a fourth peripheral area. The third and fourth peripheral areas are respectively formed at opposite side portions of the lower substrate to connect the first and second peripheral areas to each other. The driving unit is disposed on the lower substrate. The lower substrate includes a plurality of pixel portions, at least one output pad and at least one connection line. The pixel portions are formed in a display area, and are electrically connected to a pixel driving section of the driving unit. The output pad is formed in a first peripheral area along a first side of the display area, and is electrically connected to the application module through the printed circuit film. The connection line is formed in at least one of the third and fourth peripheral areas to be electrically connected to the output pad and an application driving section of the driving unit. The upper substrate faces the lower substrate. The liquid crystal layer is interposed between the lower and upper substrates.

According to the above, a printed circuit film and a connector, which are disposed on a rear surface of a backlight module, are omitted to reduce the number of parts and reduce the size of a display device.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE EMBODIMENTS

Figure 1:
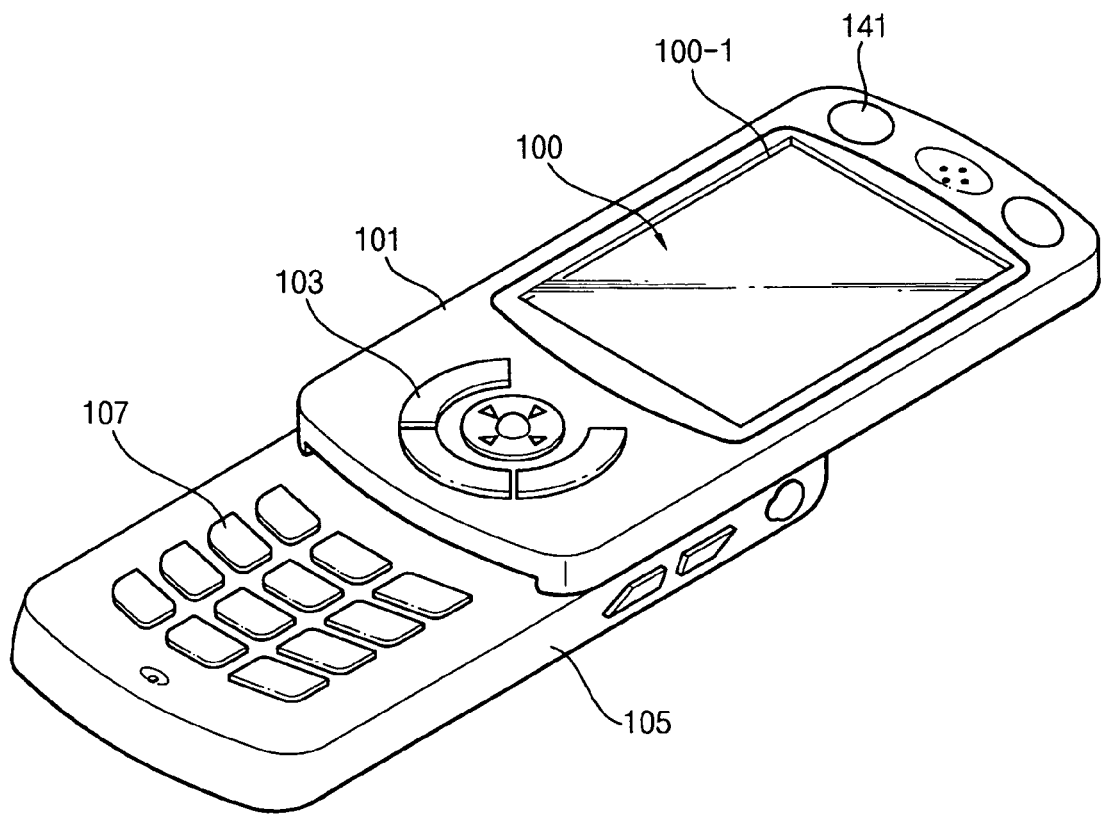
FIG. 1 is a perspective view illustrating a portable electronic apparatus employing a display device according to an exemplary embodiment of the present invention.

The invention is described fully below with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Display Device

Figure 2:
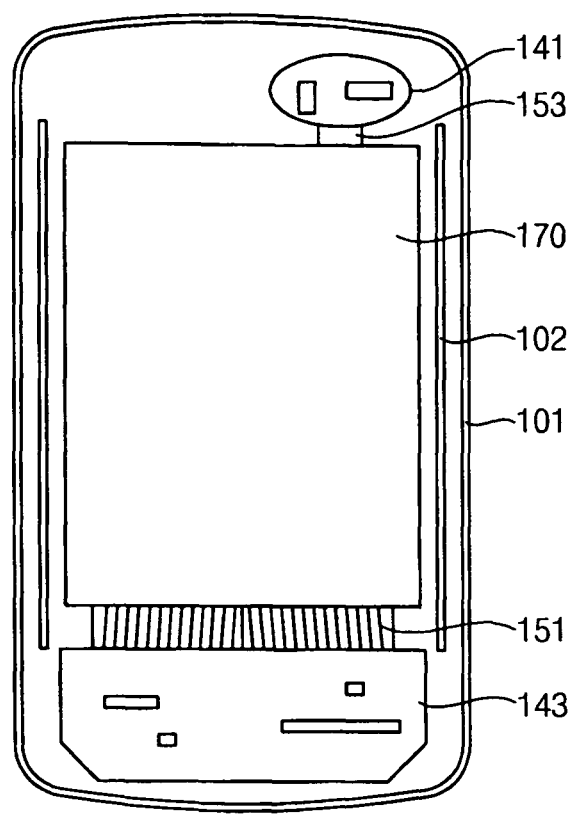
FIG. 2 is a plan view illustrating a rear surface of the display device illustrated in FIG. 1.

FIG. 1 is a perspective view illustrating a portable electronic apparatus employing a display device according to an exemplary embodiment of the present invention. FIG. 2 is a plan view illustrating a rear surface of the display device illustrated in FIG. 1.

Referring to FIGS. 1 and 2, a portable electronic apparatus 10 is a cellular phone of a slide type. The cellular phone 10 of a slide type includes a slide part 101 serving as an outer housing and receiving a display device 100 and a body part 105 receiving a main driving board driving the display device 100 and including body part control buttons 107.

The slide part 101 is coupled to the body part 105 to slide with respect to the body part 105. Guide grooves 102 are formed at left and right edge portions of a rear surface of the slide part 101, as shown in FIG. 2. The guide grooves 102 may slide along guide portions formed at the body part 105. Display window 100-1 is open at the slide part 101, and slide part control buttons 103 are disposed below the display window 100-1.

The display device 100 may include a display panel 110, an application module 141, a sub-driving board (hereinafter referred to as "first driving board") 143 and a panel printed circuit film 151.

The display panel 110 displays an image through the display window of the slide part 101. The application module 141 and the display panel are received in the slide part 101, and as shown in FIG. 1, the application module 141 is disposed adjacent to and above display window 100-1 of the display panel. The first driving board 143 is received in the slide part 101 and disposed below the display panel corresponding to the slide part control buttons 103. The first driving board 143 may be electrically connected to the main driving board (hereinafter referred to as "second driving board") received in the body part 105 through a flexible printed circuit film. A first end portion of the panel printed circuit film 151 may be electrically connected to the display panel, and a second end portion of the panel printed circuit film 151 may be electrically connected to the first driving board 143.

The second driving board may output a panel driving signal driving the display panel and a module-driving signal driving the application module 141 to the first driving board 143. The second driving board may be controlled using the body part control buttons 107. The first driving board 143 transmits the panel driving signal to the display panel, and the module-driving signal to the application module 141. The first driving board 143 may be controlled using the slide part control buttons 103.

Figure 3:
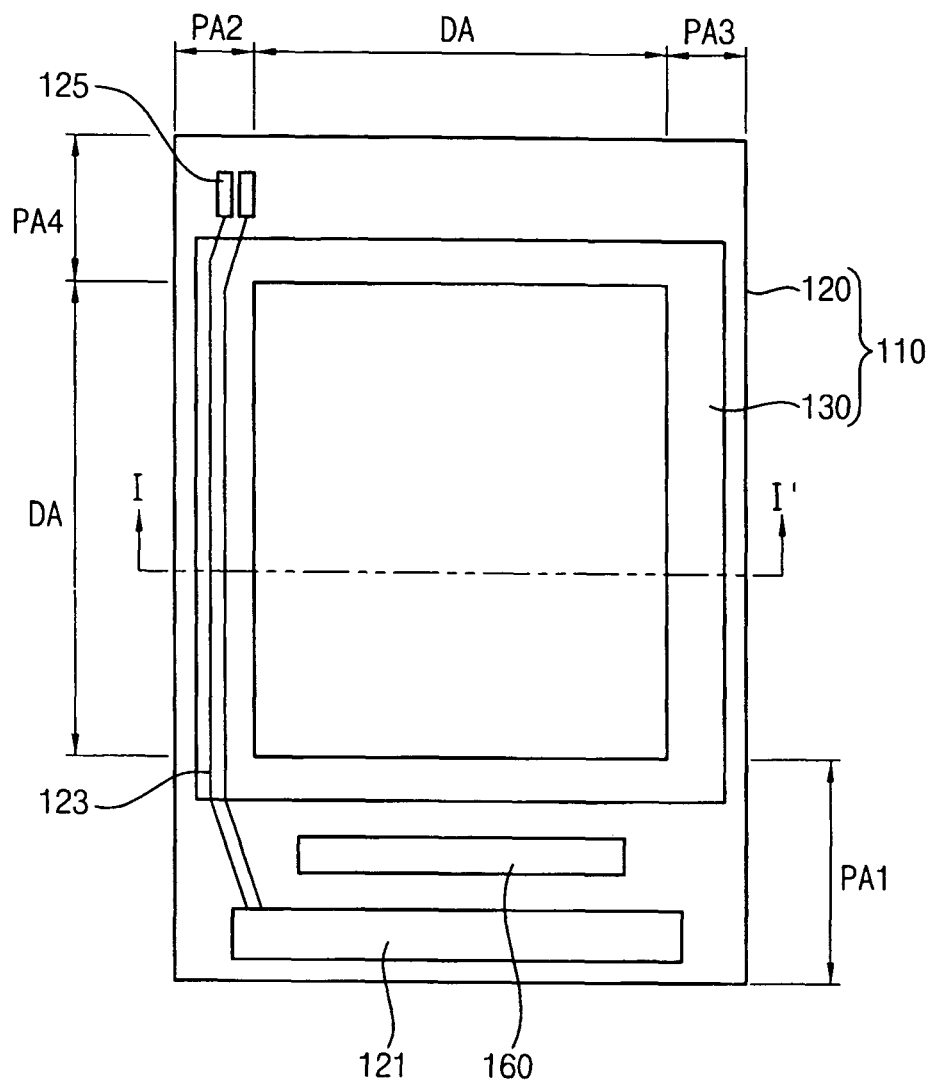
FIG. 3 is a plan view illustrating a display panel of the display device illustrated in FIG. 2.
Figure 4:
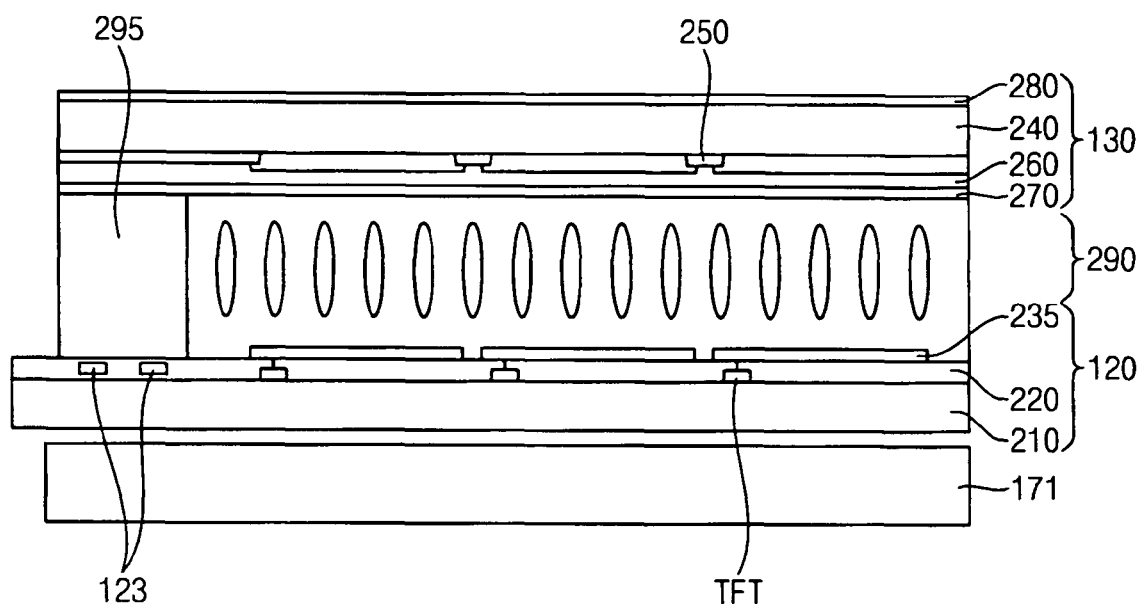
FIG. 4 is a cross-sectional view taken along a line I-I' in FIG. 3.

FIG. 3 is a plan view illustrating display panel 110 of the display device 100 illustrated in FIG. 2. FIG. 4 is a cross-sectional view taken along a line I-I' in FIG. 3.

Referring to FIGS. 3 and 4, display panel 110 includes a lower substrate 120, an upper substrate 130 and a liquid crystal layer 290.

The lower substrate 120 includes a lower base substrate 210 and a plurality of pixel portions.

The lower base substrate 210 may include glass that is optically isotropic. As shown in FIG. 3, the lower base substrate 210 may have a substantially rectangular shape viewed in a plan view. Thus, the lower base substrate 210 includes left and right long sides opposite to each other, and upper and lower short sides opposite to each other.

A display area DA and peripheral area are defined on the lower base substrate 210. The display area DA may have a substantially rectangular shape, and the peripheral area encloses the display area DA. The peripheral area includes a first peripheral area PA1, a second peripheral area PA2, a third peripheral area PA3 and a fourth peripheral area PA4. The first peripheral area PA1 is defined as an area having a predetermined width from the lower short side of the lower base substrate 210 to the lower side of the display area DA. The second peripheral area PA2 is defined as an area having a predetermined width from the left long side of the lower base substrate 210 to the left side of the display area DA. The third peripheral area PA3 is defined as an area having a predetermined width from the right long side of the lower base substrate 210 to the right side of the display area DA. The fourth peripheral area PA4 is defined as an area having a predetermined width from the upper short side of the lower base substrate 210 to the upper side of the display area DA.

The pixel portions are formed in the display area DA. Each of the pixel portions includes a thin-film transistor (TFT) layer 220 and a pixel electrode 235.

The TFT layer 220 includes signal lines applying data signals and gate signals to the pixel portions in accordance with the panel driving signal and a switching element TFT.

The signal lines include data lines receiving the data signals and gate lines receiving the gate signals that control the switching element TFT. The gate lines and the data lines are insulated from each other by a gate insulation layer, and cross each other. The gate lines and data lines may define unit pixel areas.

The switching element TFT includes a source electrode electrically connected to a data line, a gate electrode electrically connected to a gate line and a drain electrode electrically connected to the pixel electrode 235.

The pixel electrode 235 is formed in the unit pixel areas on the TFT layer 220. The pixel electrode 235 may include a transparent and conductive material, for example, such as indium tin oxide (ITO), indium zinc oxide (IZO), etc.

The display panel 110 may further include a driving section 160 outputting the data signals and the gate signals. The driving section 160 may have a chip shape, and may be electrically connected to a gate pad and a data pad formed in the first peripheral area PA1 of the lower substrate 120. The gate lines extending from an output terminal of the driving section 160 extend in the second peripheral area PA2 and the third peripheral area PA3, and extend to the display area DA, as described above. The data lines extending from the output terminal of the driving section 160 extend in the first peripheral area PA1, and extend to the display area DA. A first pad 121, a connection line 123 and a second pad 125 may be formed on the lower substrate 120.

The first pad 121 may be formed at an edge portion adjacent to the lower short side of the lower base substrate 210 in the first peripheral area PA1. The first pad 121 may include a plurality of connection terminals. The connection terminals disposed at a middle portion, except for the connection terminals disposed at left and right portions, are defined as first connection terminals, and the connection terminals disposed at the left and right portions are defined as second connection terminals.

The first connection terminals may be electrically connected to input terminals of the driving section 160. The first connection terminals may receive the panel-driving signal. The second connection terminals may receive the module-driving signal.

The connection line 123 is formed in the second peripheral area PA2, and extends along the left long side of the lower base substrate 210. The connection line 123 extends to the first peripheral area PA1 to be electrically connected to the second connection terminals of the first pad 121. In an exemplary embodiment, since the connection line 123 is formed in the second peripheral area PA2, the connection line 123 may be electrically connected to the second connection terminals disposed at the left portion. Alternatively, the connection line 123 may be further formed in or only formed in the third peripheral area PA3, and the connection line 123 formed in the third peripheral area PA3 may be electrically connected to the second connection terminals disposed at the right portion.

The second pad 125 may be formed in an upper edge portion of the second peripheral area PA2 or in the fourth peripheral area PA4. The second pad 125 may externally provide the application module driving signal. The number of terminals of the second pad 125 is smaller than the number of terminals of the first pad 121, and the second pad 125 may be electrically connected to the connection line 123 that extends to the fourth peripheral area PA4. The first pad 121, the second pad 125 and the connection line 123 may be formed simultaneously with the pixel portions during a predetermined process of the processes in which the pixel portions are formed.

Figure 5:
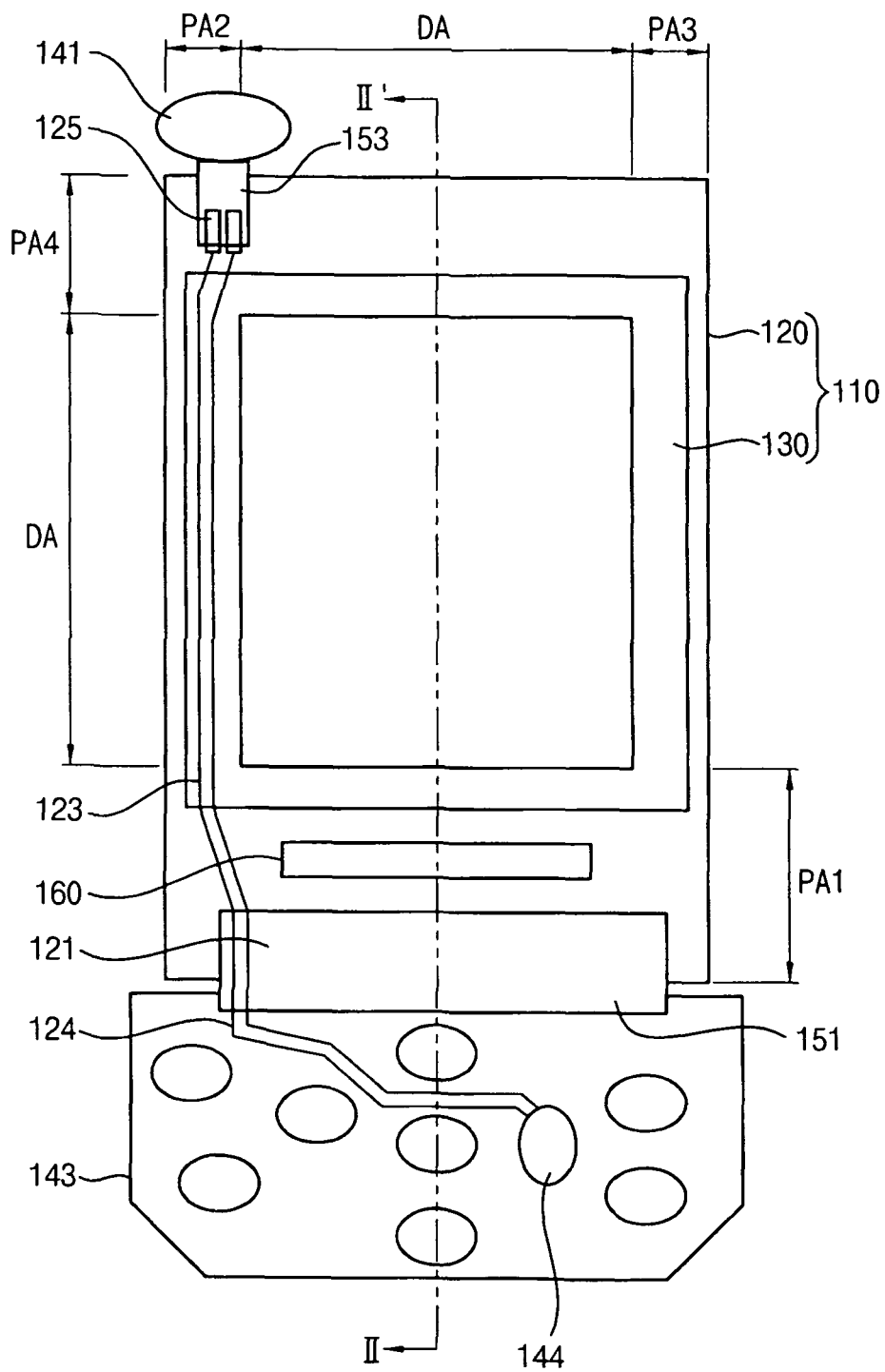
FIG. 5 is a plan view illustrating the display device illustrated in FIG. 2.
Figure 6:
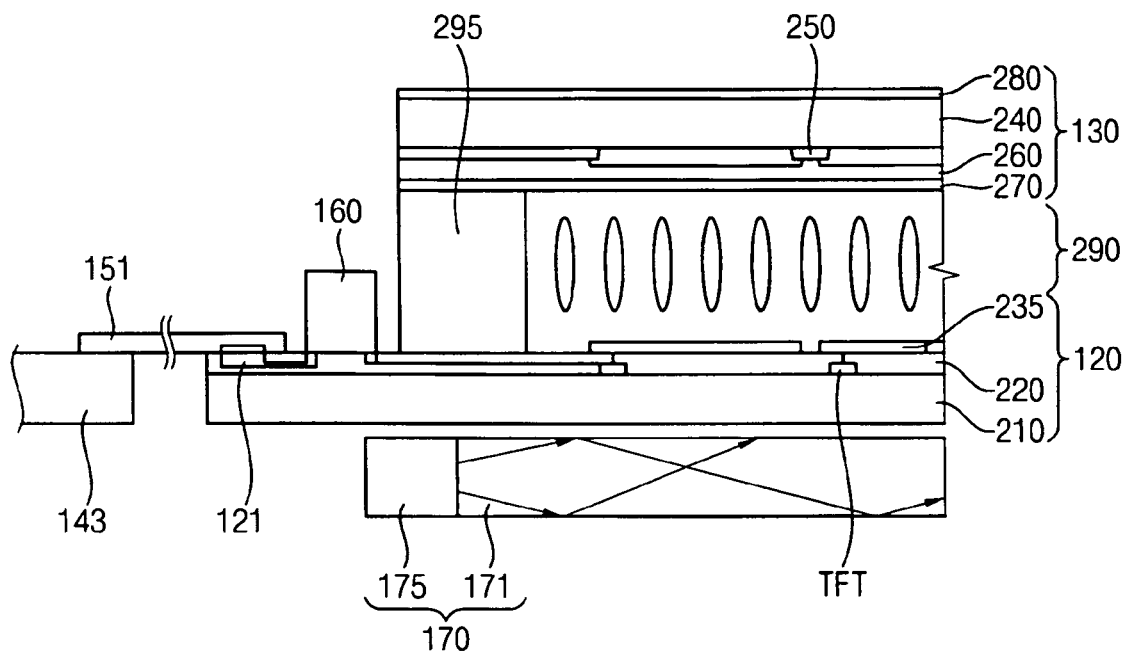
FIG. 6 is a cross-sectional view taken along a line II-II' in FIG. 5.

FIG. 5 is a plan view illustrating the display device illustrated in FIG. 2. FIG. 6 is a cross-sectional view taken along a line II-II' in FIG. 5.

Referring to FIGS. 5 and 6, the upper substrate 130 is coupled to the lower substrate 120 to face the lower substrate 120. The upper substrate 130 is disposed to overlap the display area DA and partially overlap the first peripheral area PA1, the second peripheral area PA2, the third peripheral area PA3 and the fourth peripheral area PA4 with predetermined widths. The upper substrate 130 may include an upper base substrate 240 facing the lower base substrate 210, a light-blocking layer 250, a color filter portion 255, a protective layer 260 and a common electrode 270.

The upper base substrate 240 may include glass, and the light-blocking layer 250 may be formed on the upper base substrate 240 in a matrix shape, corresponding to the gate lines and data lines. In addition, the light-blocking layer 250 overlaps the first peripheral area PA1, the second peripheral area PA2, the third peripheral area PA3 and the fourth peripheral area PA4 with predetermined widths along sides of the display area DA. Thus, the light-blocking layer 250 defines the display area DA, and covers the connection line 123 formed in the second peripheral area PA2. The light-blocking layer 250 may include, for example, a metal of chromium group, or an organic material.

The color filter portion 255 may include a red color filter, a green color filter and a blue color filter. The color filter portion 255 may be formed at openings defined by the light-blocking layer 250. The protective layer 260 covers the color filter portion 255 to protect the color filter portion 255. The common electrode 270 may include a transparent and conductive material, for example, such as ITO or IZO.

The liquid crystal layer 290 is interposed between the lower substrate 120 and the upper substrate 130. An electric field generated between the pixel electrode 235 and the common electrode 270 rearranges liquid crystal molecules of the liquid crystal layer 290 to control optical transmissivity of light passing through the liquid crystal layer 290.

The display panel 110 may further include a sealing member 295 that adjusts an interval between the lower substrate 120 and the upper substrate 130 and seals liquid crystal between the lower substrate 120 and the upper substrate 130.

The display panel 110 may further include a first polarizer (not shown) disposed on a rear surface of the lower substrate 120 and a second polarizer 280 disposed on a front surface of the upper substrate 130.

The application module 141 may be disposed adjacent to the fourth peripheral area PA4 of the display panel 110. The application module 141 may include, for example, a part that amplifies a voice, a part that photographs an image, a part that vibrates the display device 100, etc. such as a speaker, a camera, a vibrator, etc.

The display device 100 may include a printed circuit film 153. The printed circuit film 153 has a first end portion electrically connected to the second pad 125, and a second end portion electrically connected to the application module 141.

The first driving board 143 applies the panel driving signal and the module-driving signal provided from the second driving board to the first pad 121. A first driving element, for example, a timing controller, a power control element, etc. may be mounted on the first driving board 143 to drive the display panel 110. In addition, a second driving element 144 may be mounted on the first driving board 143 to drive the application module 141.

The panel printed circuit film 151 has a first end portion electrically connected to the first pad 121, and a second end portion electrically connected to the first driving board 143. The panel printed circuit film 151 is electrically coupled to the first connection terminals of the first pad 121 and the second connection terminals of the first pad 121. A module control line 124 is formed on the first driving board 143 to electrically connect the panel printed circuit film 151 and the second driving element 144 to each other.

As shown in FIGS. 2 and 6, the display device 100 may further include a backlight module. The backlight module is disposed on a rear surface of the display panel 110 to provide light for displaying an image. The backlight module may include a light source and a light-guiding plate. The light-guiding plate is disposed on a rear surface of the lower substrate 120. The light source provides light to a side surface of the light-guiding plate.

The application module 141 of the display device 100 is electrically connected to the first driving board 143 through the printed circuit film, the second pad 125, the connection line 123, the first pad 121 and the panel printed circuit film 151. The module control line 124 formed on the first driving board 143 is directly connected to the second driving element 144. Thus, an additional flexible printed circuit film electrically connecting the application module 141 to a driving board, and a connector electrically connecting the second driving element 144 to the additional flexible printed circuit film may be omitted. Hence, the display device 100 may become slimmer. Also, noise, which may be generated when the additional flexible printed circuit film is disposed on the rear surface of the backlight module, may be prevented.

The display panel 110 may include a liquid crystal inlet (not shown) through which liquid crystal molecules are injected to form the liquid crystal layer 290. Alternatively, the liquid crystal layer 290 may be formed by dropping the liquid crystal molecules on the lower substrate 120 or the upper substrate 130. When the liquid crystal layer 290 is formed through the dropping method, the liquid crystal inlet may be omitted. The liquid crystal inlet may be formed at a location corresponding to the second peripheral area PA2 and/or the third peripheral area PA3 except for the first and fourth peripheral areas PA1 and PA4, since the first pad 121, the second pad 125 and the driving section 160, etc. are formed in the first and fourth peripheral areas PA1 and PA4.

The connection line 123 of the display panel 110 may have relatively low electrical resistance. For example, the connection line 123 may have a width wider than the gate line and/or the data line. For example, the width of the connection line 123 may be in a range of about 8 μm to about 15 μm. The connection line 123 may have, for example, a three-layered structure, in which a molybdenum (Mo) layer, an aluminum (Al)-neodymium (Nd) layer and a molybdenum (Mo) layer are successively formed, so as to reduce the electrical resistance.

The display device 100 may further include a touch panel (not shown) disposed at a surface of the display panel 110 to generate positional information through an external touch. Alternatively, a touch signal generating section (not shown) may be formed at the display panel 110 of the display device 100 to generate positional information through an external touch.

Figure 7:
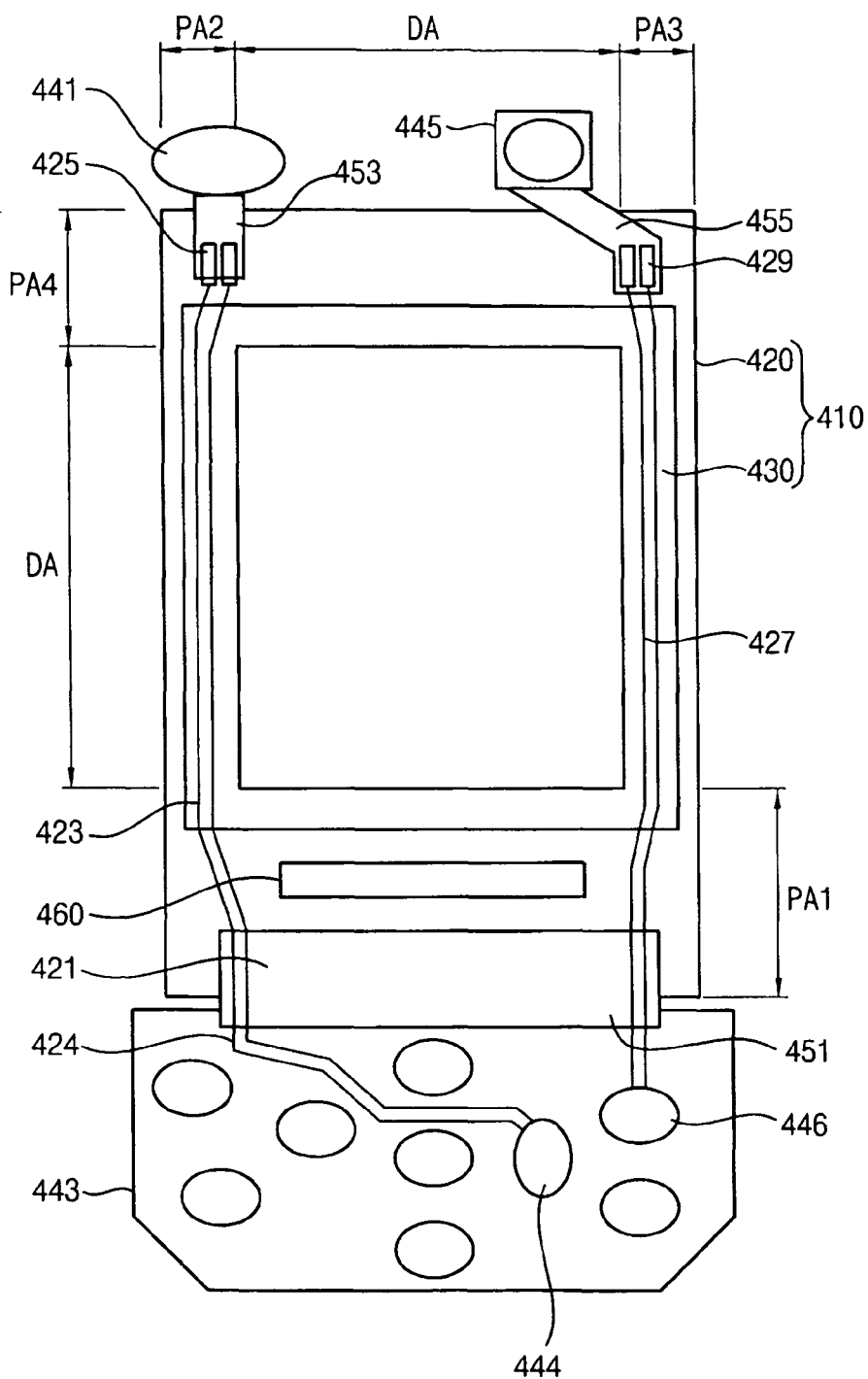
FIG. 7 is a plan view illustrating a display device according to another exemplary embodiment of the present invention.

FIG. 7 is a plan view illustrating a display device according to another exemplary embodiment of the present invention.

Referring to FIG. 7, a display device 400 includes a display panel 410, a first application module 441, a second application module 445, a first driving board 443, a panel printed circuit film 451, a first printed circuit film 453 and a second printed circuit film 455. The display device 400 is substantially the same as the display device 100 illustrated in FIGS. 2, 3, 4, 5 and 6 except for the following description.

The display panel 410 includes a lower substrate 420, an upper substrate 430 and a liquid crystal layer. A first connection line 423 is formed in a second peripheral area PA2 of the lower substrate 420, and a second connection line 427 is formed on a third peripheral area PA3. The second connection line 427 is electrically connected to second connection terminals formed at a right portion of a first pad 421. A third pad 429 is formed in a fourth peripheral area PA4 to be electrically connected to the second connection line 427.

The first printed circuit film 453 electrically connects a second pad 425 and the first application module 441 to each other. The second printed circuit film 455 electrically connects the third pad 429 and the second application module 445 to each other. The first application module 441 corresponds to the application module 141 illustrated in FIG. 5. The second application module 445 may be disposed adjacent to the fourth peripheral area PA4 of the display panel 410 and may have a different function from the first application module 441.

The panel printed circuit film 451 electrically connects the first pad 421 and the first driving board 443 to each other. A first driving element driving the display panel 410, a second driving element 444 driving the first application module 441 and a third driving element 446 driving the second application module 445 may be mounted on the first driving board 443.

Method of Manufacturing a Display Device

Figure 8:
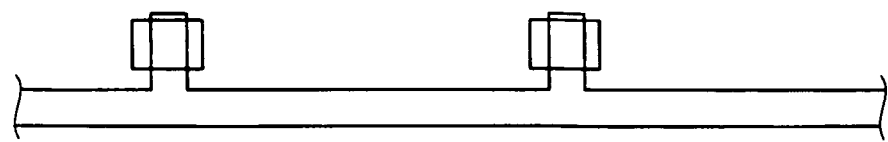
FIGS. 8 to 10 are plan views illustrating a method of manufacturing a display device according to an exemplary embodiment of the present invention.
Figure 8:
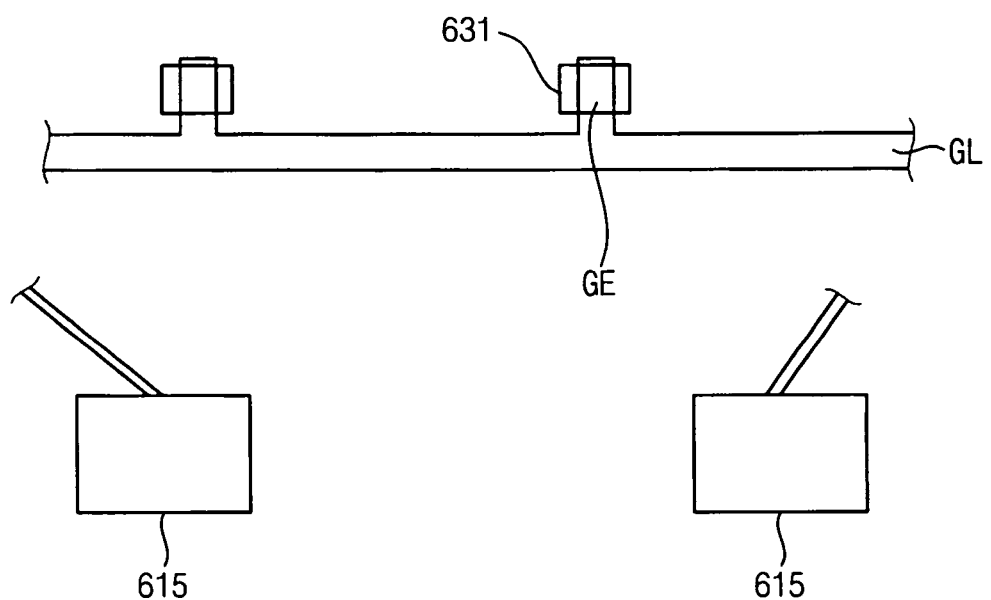
Figure 9:
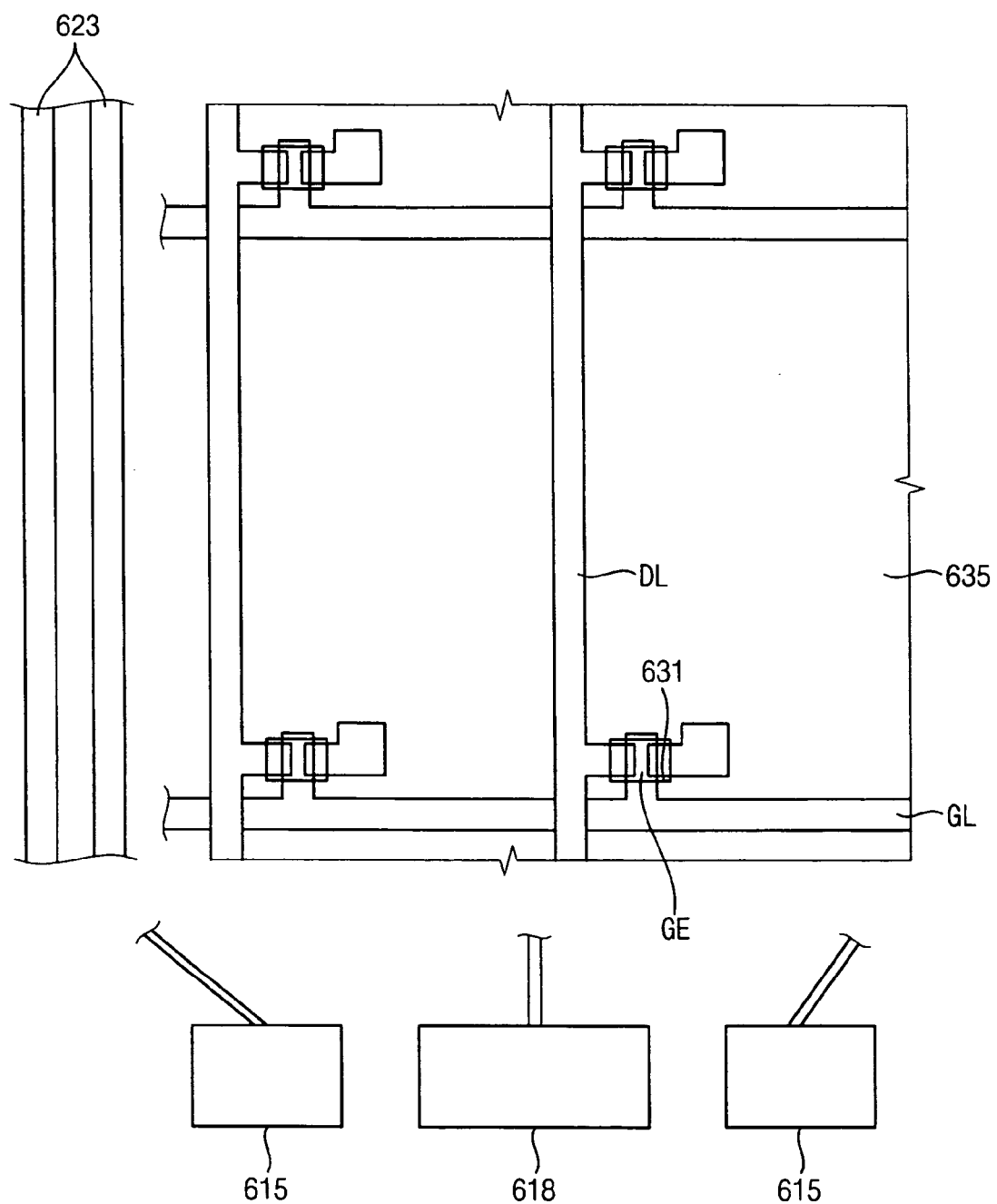
Figure 10:
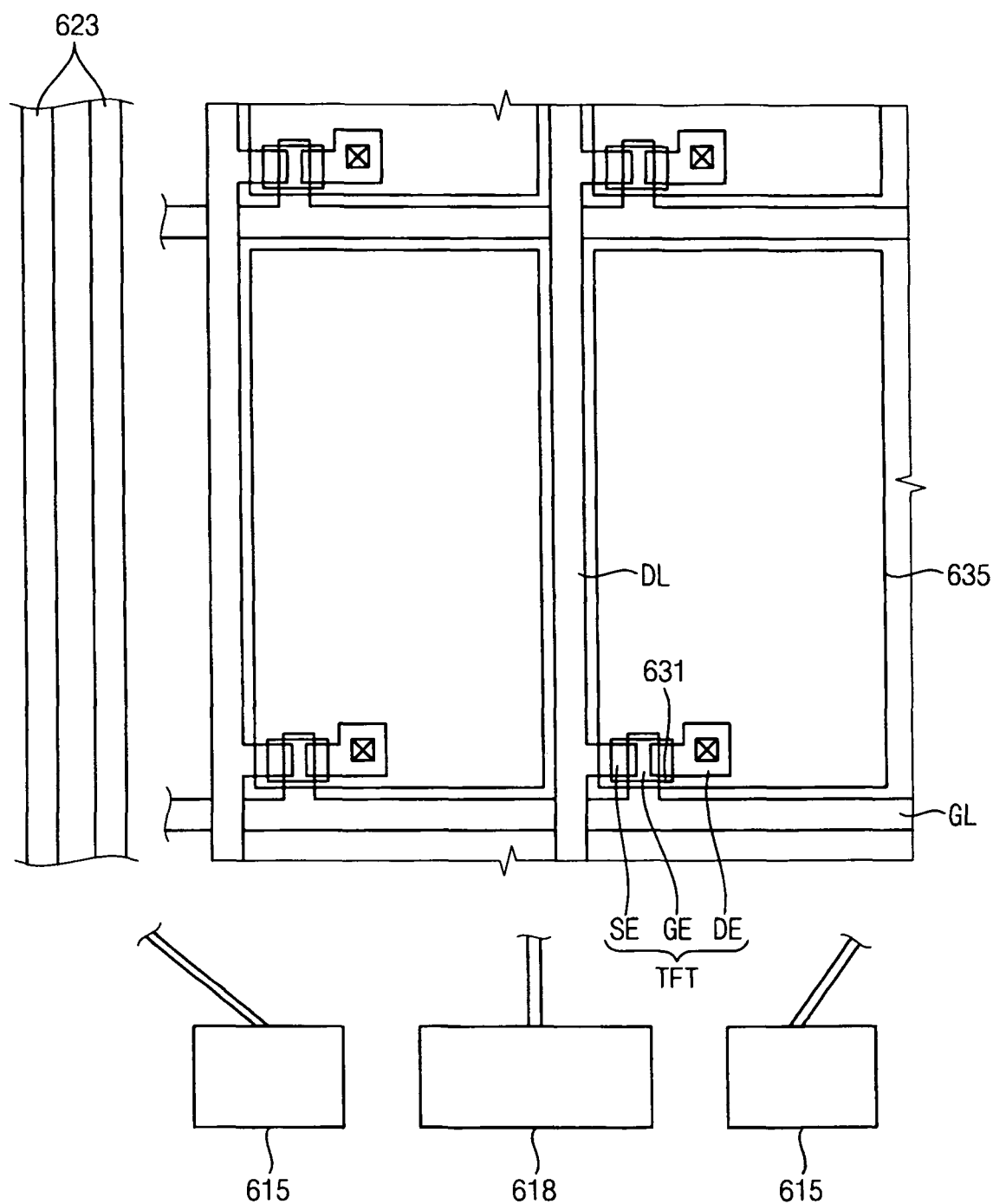

FIGS. 8 to 10 are plan views illustrating a method of manufacturing a display device according to an exemplary embodiment of the present invention.

Referring to FIGS. 8 to 10, in order to manufacture a display device, a plurality of pixel portions is formed in a display area of a lower substrate. Then, a first pad is formed in a first peripheral area formed at a side of a display area to be electrically connected to the pixel portions, a connection line 623 is formed in a second peripheral area that is formed at a second side of the display area and is connected to the first peripheral area to be electrically connected to the first pad, and a second pad is formed to be electrically connected to the connection line 623. Thereafter, a panel driving signal driving the pixel portions and a panel printed circuit film applying module-driving signal are electrically connected to the first pad. Then, an application module driven in response to the module-driving signal is electrically connected to the second pad through a printed circuit film.

The pixel portions may be formed by forming gate lines GL in the display area, forming data lines DL insulated from the gate lines GL in the display area, forming a thin-film transistor TFT electrically connected to a gate line GL and a data line DL and forming a pixel electrode 635 electrically connected to the thin-film transistor TFT.

As shown in FIG. 8, in order to form the pixel portions, a gate metal layer is formed on the lower substrate. Then, the gate metal layer is patterned to form the gate lines GL in the display area of the lower substrate through a photolithography process. The gate lines GL are substantially in parallel with each other. A gate pad 615 may be formed in the first peripheral area through the photolithography process.

Thereafter, a gate insulation layer is deposited on the lower substrate having the gate lines GL to cover the gate lines GL and expose the gate pad 615. A semiconductor layer is deposited on the gate insulation layer. The semiconductor layer is patterned to form an active layer 631 corresponding to the gate electrode GE through a photolithography process.

As shown in FIG. 9, a source metal layer is deposited on the lower substrate having the active layer 631, and the data lines DL are formed in the display area to cross the gate lines GL through a photolithography process. The source metal layer deposited in the second peripheral area may be patterned simultaneously with the data lines DL through the photolithography process to form the connection line 623. Also, the data pad 618 electrically connected to the data lines DL may be formed in the first peripheral area simultaneously with the data lines DL. The data lines DL and the connection line 623 are substantially in parallel with each other.

The source metal layer of the first peripheral area is patterned simultaneously with forming the data lines DL to form a first pad electrically connected to the gate pad 615, the data pad 618 and the connection line 623.

When the connection line 623, instead of a flexible printed circuit film, is formed to electrically connect the application module and the driving board, the connection line 623 has an electrical resistance that may be greater than a reference electrical resistance of a wiring for driving the application module. Thus, the source metal layer may include a material having a low electrical resistance such as a molybdenum (Mo) layer, an aluminum (Al)-neodymium (Nd) layer and a molybdenum (Mo) layer so that the connection line 623 may have a suitable electrical resistance. Alternatively, the semiconductor layer may be patterned through the same process as the source metal layer.

Thereafter, as shown in FIG. 10, the data line DL on the active layer 631 are partially removed to form the thin-film transistor TFT including a gate electrode GE, the active layer 631, an source electrode SE and a drain electrode DE.

Then, a protective layer is formed to protect the thin-film transistor TFT and have an opening partially exposing the drain electrode DE. A transparent and conductive material such as indium tin oxide (ITO), indium zinc oxide (IZO), etc. is deposited on the lower substrate and patterned to form the pixel electrode 635 electrically connected to the drain electrode DE in a pixel area.

Before the panel printed circuit film is connected to the first pad and the printed circuit film is connected to the second pad, an upper substrate having a light-blocking layer that defines a color filter portion facing the pixel portions and a display area, and covers the connection line 623 may be coupled to the lower substrate. A liquid crystal layer may be injected between the lower substrate and the upper substrate. A driver chip driving the pixel portions in response to the panel-driving signal applied from the first pad may be mounted on the gate pad 615 and the data pad 618.

According to the present invention, an application module is electrically connected to a driving board through a connection line formed on a display panel of a display device. Thus, the thickness of the display device may become slim, and the noise of the display device may be prevented.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device having pixel portions each driven by way of a respective gate line and by way of a respective data line, the display device further comprising:
   a display panel comprising:
      a lower substrate having a display area surrounded by peripheral areas, said peripheral areas including a first peripheral area (PA1) disposed at a bottom portion of the lower substrate, a second peripheral area (PA2) disposed at a first side portion of the lower substrate, a third peripheral area (PA3) disposed at an opposed second side portion of the lower substrate and a fourth peripheral area (PA4) disposed at a top portion of the lower substrate opposite to the bottom portion, the second and third peripheral areas (PA2, PA3) extending between and connecting at their ends of extension to the first and fourth peripheral areas (PA1, PA4),
      the lower substrate further including a plurality of the pixel portions which plurality is formed in the display area, at least one output pad formed in the fourth peripheral area and at least one connection line integral with and extending through at least one of the second and third peripheral areas (PA2, PA3) and into the fourth peripheral area and electrically connecting to the at least one output pad of the fourth peripheral area, where the at least one connection line is not connected to drive the pixel portions of the display device;
      an upper substrate spaced apart from and facing the lower substrate; and
      a liquid crystal layer interposed between the lower and upper substrates;
   at least one application module disposed adjacent to the fourth peripheral area;
   at least one printed circuit film extending from the fourth peripheral area and electrically connecting the output pad to the application module; and
   a main driving unit coupled electrically by way of the first peripheral area of the lower substrate to the display panel and to the at least one application module, the main driving unit comprising:
      a display panel controlling section configured to control drivings of all the gate lines and of all the data lines of the display device and to thus control driving of the display panel; and
      an application driving section configured to interface with the application module;
      wherein the application driving section is electrically connected to the output pad by way of the connection line to thereby interface with the application module.

2. The display device of claim 1, wherein the main driving unit is not integrally united with the display panel and wherein the main driving unit is disposed adjacent to the first peripheral area (PA1), the main driving unit including a printed circuit board separate from the display panel.

3. The display device of claim 2, wherein
   the lower substrate further comprises at least one input pad formed in the first peripheral area (PA1), and
   the at least one connection line is electrically connected to the input pad.

4. The display device of claim 3, further comprising a flexible panel printed circuit film electrically connecting the main driving unit to the at least one input pad.

5. The display panel of claim 2 wherein the main driving unit is electrically coupled to the display panel by way of a flexible printed circuit film.

6. The display device of claim 1, wherein the upper substrate comprises a light-blocking layer configured to block light and cover the at least one connection line.

7. The display device of claim 1, wherein the lower substrate comprises:
   a plurality of the gate lines extending in a first direction and in a first wiring layer to be electrically connected to respective ones of the pixel portions; and
   a plurality of the data lines extending in a second direction crossing the first direction and in a second wiring layer so as to be electrically connected to respective ones of the pixel portions, and
   wherein the at least one connection line is not a gate line or a data line but is formed in a same wiring layer as that of one of the plurality of gate lines and the plurality of data lines.

8. The display device of claim 7, wherein the at least one connection line has a width greater than a corresponding width of the gate lines or a corresponding width of the data lines of the corresponding wiring layer in which the at least one connection line is formed.

9. The display device of claim 8, wherein the width of the at least one connection line is in a range of from about 8 μm to about 15 μm.

10. The display device of claim 1, wherein the display panel controlling section and the application driving section are integrally formed with one another.

11. The display device of claim 1, wherein the display panel controlling section and the application driving section are separately formed.

12. The display device of claim 1, further comprising:
a backlight module disposed on a rear surface of the display panel;
a first receiving container configured to receive the display panel, the driving unit and the backlight module;
a driving board electrically connected to the main driving unit; and
a second receiving container configured to receive the driving board, the second receiving container being slidably coupled to the first receiving container.

13. The display device of claim 1, wherein the display panel further comprises a touch signal generating section configured to generate positional information responsive to an external touch.

14. The display panel of claim 1 wherein the application module includes a camera.

15. The display panel of claim 1 wherein the application module includes a vibrator.

16. The display panel of claim 1 wherein the application module includes a sound producing device.

17. A method of manufacturing a display device that has pixel portions each of which is driven by way of a respective gate line and by way of a respective data line, the method comprising:
forming a display panel including a plurality of the pixel portions which plurality is formed in a display area, the display area being surrounded by a plurality of peripheral areas, where the peripheral areas include a first peripheral area (PA1) disposed at a bottom portion of the display panel, a second peripheral area (PA2) disposed at a first side portion of the display panel, a third peripheral area (PA3) disposed at an opposed second side portion of the display panel and a fourth peripheral area (PA4) disposed at a top portion of the display panel opposite to the bottom portion, the second and third peripheral areas (PA2, PA3) extending between and connecting at their ends of extension to the first and fourth peripheral areas (PA1, PA4);
forming at least one output pad in the fourth peripheral area (PA4);
forming at least one connection line that is not connected to function as either a gate line or as a data line and to thus drive a respective one or more of the pixel portions of the display device, the formed at least one connection line being integral with and extending through at least one of the second and third peripheral areas (PA2, PA3) and into the fourth peripheral area (PA4) as well as into the first peripheral area (PA1) so as to thereby provide electrical connection between the first and fourth peripheral areas (PA1,PA4), the at least one connection line being electrically connected to the output pad;
electrically connecting at least one application module disposed adjacent to the fourth peripheral area (PA4) to the output pad through at least one printed circuit film; and
electrically connecting an application driving module that is configured to interface with the application module to the at least one connection line by way of a connection made in the first peripheral area (PA1).

18. The method of claim 17,
wherein the pixel portions are driven by respective gate lines formed in a first wiring layer, and by respective data lines formed in a second wiring layer and crossing with the gate lines, and by a plurality of respective thin-film transistors (TFTs) each electrically connected to a respective one of the gate lines and a respective one of the data lines, and the pixel portions include respective pixel electrodes electrically connected to respective ones of the TFTs, and
wherein the forming of the at least one connection line includes simultaneously forming the at least one connection line in a corresponding one or the other of the first and second wiring layers with a corresponding forming of one of the gate lines and the data lines.

19. A display panel adapted for use in a display device that has pixel portions each of which is driven by way of a respective gate line and by way of a respective data line, the display panel being configured to provide electrical connection between a main driving unit and at least one application module with which the main driving unit interfaces, where the main driving unit is disposed adjacent to one edge of the display panel and the at least one application module is disposed adjacent to an opposed edge of the display panel, the display panel comprising:
a lower substrate having a display area surrounded by peripheral areas, said peripheral areas including a first peripheral area (PA1) disposed at a bottom portion of the lower substrate, a second peripheral area (PA2) disposed at a first side portion of the lower substrate, a third peripheral area (PA3) disposed at an opposed second side portion of the lower substrate and a fourth peripheral area (PA4) disposed at a top portion of the lower substrate opposite to the bottom portion, the second and third peripheral areas (PA2, PA3) extending between and connecting at their ends of extension to the first and fourth peripheral areas (PA1, PA4), the main driving unit being operatively coupled to the lower substrate by way of a plurality of connections made in the first peripheral area (PA1), the lower substrate including:
a plurality of the pixel portions of the display device, where the plurality is formed in a display area, the plurality of the pixel portions being electrically connected to a pixel portions driving section of the main driving unit, wherein the pixel portions driving section is configured to control drivings of all the gate lines and of all the data lines of the display device;
at least one output pad formed in the fourth peripheral area (PA4), the output pad being electrically connected to the application module through a flexible printed circuit film; and
at least one connection line integrally formed in, and extending through, at least one of the second and third peripheral areas so as to provide electrical interconnection between the at least one output pad and an application driving section of the main driving unit, where the at least one connection line is not connected to function as either a gate line or as a data line used to drive a respective one or more pixel portions of the display device;
an upper substrate facing the lower substrate; and
a liquid crystal layer interposed between the lower and upper substrates.

20. The display panel of claim 19, wherein the main driving unit is not integrally united with the display panel and wherein the main driving unit is disposed adjacent to the first peripheral area (PA1), the main driving unit including a printed circuit board separate from the display panel.

21. The display panel of claim 20, wherein:
the lower substrate further comprises at least one input pad formed in the first peripheral area (PA1), and the at least one connection line is electrically connected to the input pad.

22. The display panel of claim 19, wherein the lower substrate comprises:
   a plurality of gate lines extending in a first direction to be electrically connected to the pixel portions; and
   a plurality of data lines extending in a second direction crossing the first direction, to be electrically connected to the pixel portions, and
   the at least one connection line is formed from a same wiring layer as one of the gate lines and the data lines.

* * * * *